US012663034B2

(12) United States Patent
Chen et al.

(10) Patent No.: US 12,663,034 B2
(45) Date of Patent: Jun. 23, 2026

(54) FURNITURE SYSTEM AND FURNITURE ASSEMBLY THEREOF

(71) Applicants: King Slide Works Co., Ltd., Kaohsiung City (TW); King Slide Technology Co., Ltd., Kaohsiung City (TW)

(72) Inventors: Ken-Ching Chen, Kaohsiung City (TW); Fang-Cheng Su, Kaohsiung City (TW); Yue-Hua Tang, Kaohsiung City (TW); Chun-Chiang Wang, Kaohsiung City (TW)

(73) Assignees: King Slide Works Co., Ltd., Kaohsiung City (TW); King Slide Technology Co., Ltd., Kaohsiung City (TW)

( * ) Notice: Subject to any disclaimer, the term of this patent is extended or adjusted under 35 U.S.C. 154(b) by 512 days.

(21) Appl. No.: 18/338,470

(22) Filed: Jun. 21, 2023

(65) Prior Publication Data
US 2024/0301904 A1 Sep. 12, 2024

(30) Foreign Application Priority Data
Mar. 6, 2023 (TW) .................................. 112108389

(51) Int. Cl.
F16B 12/02 (2006.01)
(52) U.S. Cl.
CPC .................................... F16B 12/02 (2013.01)

(58) Field of Classification Search
CPC .......... F16B 12/22; F16B 12/34; F16B 12/36; F16B 12/38; F16B 12/02; A47B 88/925; A47B 88/941; A47B 2088/902; A47B 88/938
See application file for complete search history.

(56) References Cited

U.S. PATENT DOCUMENTS

| | | | | |
|---|---|---|---|---|
| 5,221,134 A | * | 6/1993 | Grass ................. | A47B 88/9412 |
| | | | | 312/348.2 |
| 9,060,605 B2 | | 6/2015 | Gasser | |
| 9,161,624 B2 | | 10/2015 | Haemmerle | |
| 10,772,421 B2 | * | 9/2020 | Kampl ................... | A47B 88/46 |
| 10,772,422 B1 | * | 9/2020 | Chen .................... | A47B 88/941 |
| 10,966,523 B2 | * | 4/2021 | Kampl .................. | F16B 12/14 |
| 11,213,125 B2 | * | 1/2022 | Irgang ................. | A47B 88/944 |
| 11,304,523 B2 | * | 4/2022 | Kampl .................. | A47B 88/95 |
| 11,766,120 B2 | * | 9/2023 | Leitner ............... | A47B 88/925 |
| | | | | 312/204 |

FOREIGN PATENT DOCUMENTS

| | | | | | |
|---|---|---|---|---|---|
| DE | 102010037281 A1 | * | 3/2012 | .......... | A47B 88/931 |
| DE | 102011050157 A1 | * | 11/2012 | .......... | A47B 88/941 |
| EP | 1427310 B1 | | 10/2007 | | |
| EP | 2704604 B1 | | 9/2015 | | |
| WO | WO-03024274 A1 | * | 3/2003 | .......... | A47B 88/925 |
| WO | WO-2007137311 A2 | * | 12/2007 | .......... | A47B 88/956 |
| WO | WO-2014005164 A1 | * | 1/2014 | .......... | A47B 88/941 |
| WO | WO-2022006604 A1 | * | 1/2022 | .......... | A47B 88/925 |

* cited by examiner

*Primary Examiner* — Matthew R Mcmahon
(74) *Attorney, Agent, or Firm* — Best & Flanagan LLP

(57) ABSTRACT
A furniture assembly includes a panel, a fitting member and a connecting member. The connecting member is detachably mounted to the fitting member. The fitting member is configured to be mounted to the panel through the connecting member. The present invention also provides a furniture system.

3 Claims, 9 Drawing Sheets

FURNITURE SYSTEM AND FURNITURE ASSEMBLY THEREOF

BACKGROUND OF THE INVENTION

1. Field of the Invention

The present invention relates to a furniture system, and more particularly, to a furniture system and its furniture assembly having a fitting member to be installed according to user's requirements.

2. Description of the Prior Art

U.S. Pat. No. 9,060,605 B2 discloses a drawer, which includes a front panel, a drawer lateral wall, and an attachment element arranged at least partially over the drawer lateral wall. A portion of the attachment element is configured to be directly inserted into a recess a fitting body and then pivoted about an axis in order to be mounted at one side of the drawer.

However, in order to meet diverse requirements of the market, it is important to develop various products.

SUMMARY OF THE INVENTION

The present invention provides a furniture system and its furniture assembly having a fitting member to be installed according to user's requirements.

According to an embodiment of the present invention, a furniture assembly comprises a first panel, a fitting member and a first connecting member detachably mounted to the fitting member, wherein the fitting member is configured to be mounted to the first panel through the first connecting member.

Preferably, the fitting member comprises a first part and a second part, the first connecting member is detachably mounted to the first part of the fitting member; wherein the furniture assembly further comprises a second panel and a second connecting member; wherein the second connecting member is detachably mounted to the second part of the fitting member, the fitting member is configured to be mounted to the second panel through the second connecting member.

Preferably, one of the first connecting member and the first part of the fitting member is formed with a first space for mounting the first connecting member to the first part of the fitting member.

Preferably, at least one first convex rib is formed inside the first space, and configured to press against the other one of the first connecting member and the first part of the fitting member.

Preferably, one of the second connecting member and the second part of the fitting member is formed with a second space for mounting the second connecting member to the second part of the fitting member; wherein at least one second convex rib is formed inside the second space, and configured to press against the other one of the second connecting member and the second part of the fitting member.

According to another embodiment of the present invention, a furniture system comprises a bottom plate; a first side wall and a second side wall arranged at left and right sides of the bottom plate respectively; a first panel and a second panel arranged at front and rear sides of the bottom plate respectively; a fitting member comprising a first part and a second part; a first connecting member detachably mounted to the first part of the fitting member, wherein the fitting member is configured to be mounted to the first panel through the first connecting member; and a second connecting member detachably mounted to the second part of the fitting member, wherein the fitting member is configured to be mounted to the second panel through the second connecting member.

Preferably, one of the first panel and the first connecting member is arranged with a first connecting feature, and the other one of the first panel and the first connecting member is arranged with a second connecting feature configured to be connected with the first connecting feature.

Preferably, the first side wall comprises a bottom part and a top part, the top part and the bottom part of the first side wall define a first predetermined height, the top part of the first side wall is arranged with a mounting feature; the fitting member comprises a bottom part and a top part, the top part of the fitting member and the bottom part of the first side wall define a second predetermined height higher than the first predetermined height; wherein the fitting member is configured to be mounted to the mounting feature through the first connecting member, so as to stack the fitting member on the first side wall.

Preferably, the mounting feature is an opening, the first connecting member is arranged with at least one mounting part configured to be mounted to at least one wall at an edge of the opening; wherein the at least one mounting part has a hook configured to hook the wall.

Preferably, the second panel is arranged with a first engaging structure, and the second connecting member is arranged with a second engaging structure configured to engage with the first engaging structure, such that the fitting member and the second panel are detachably connected to each other.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
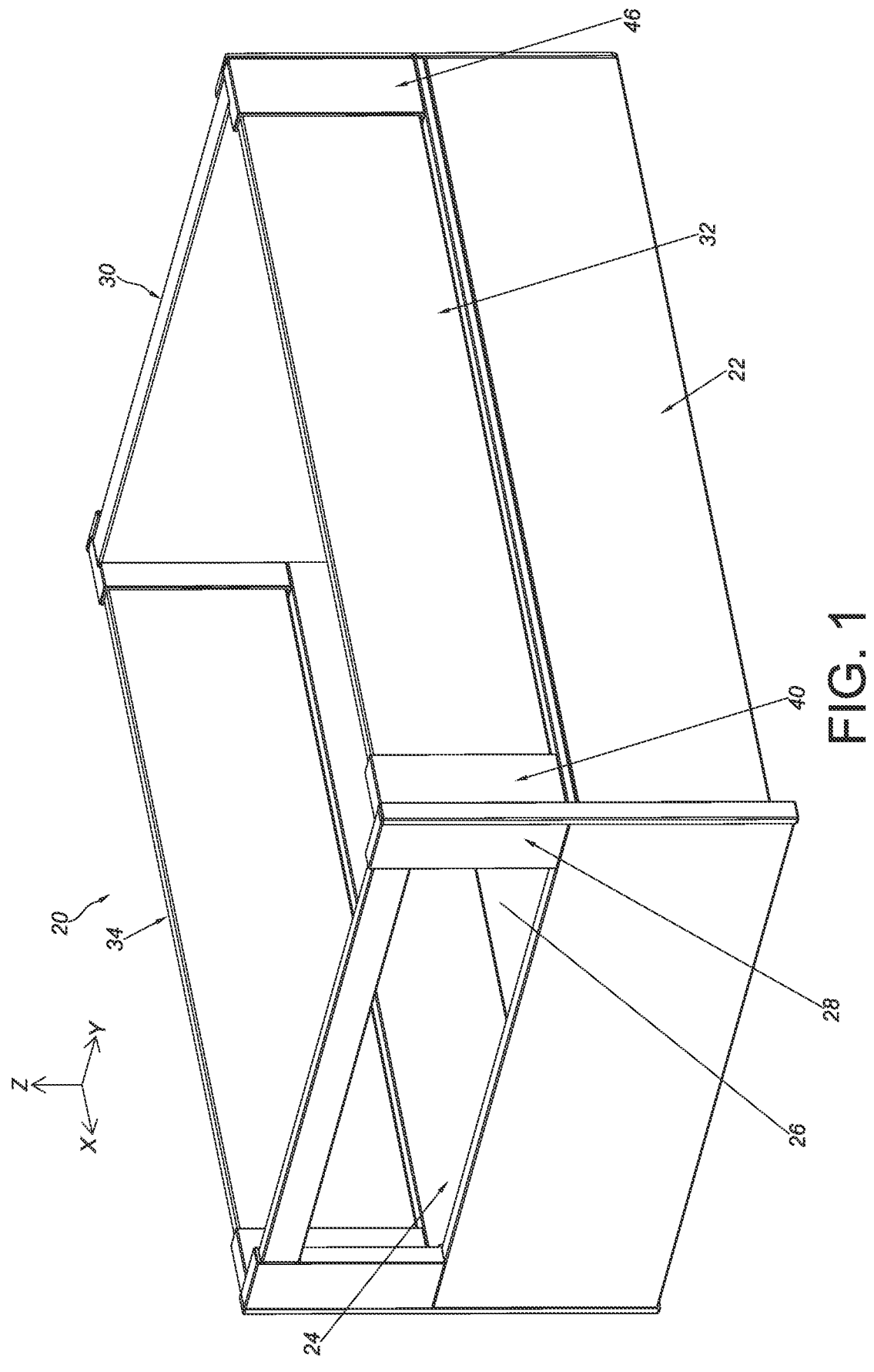
FIG. 1 is diagram showing a furniture system according to an embodiment of the present invention.
Figure 2:
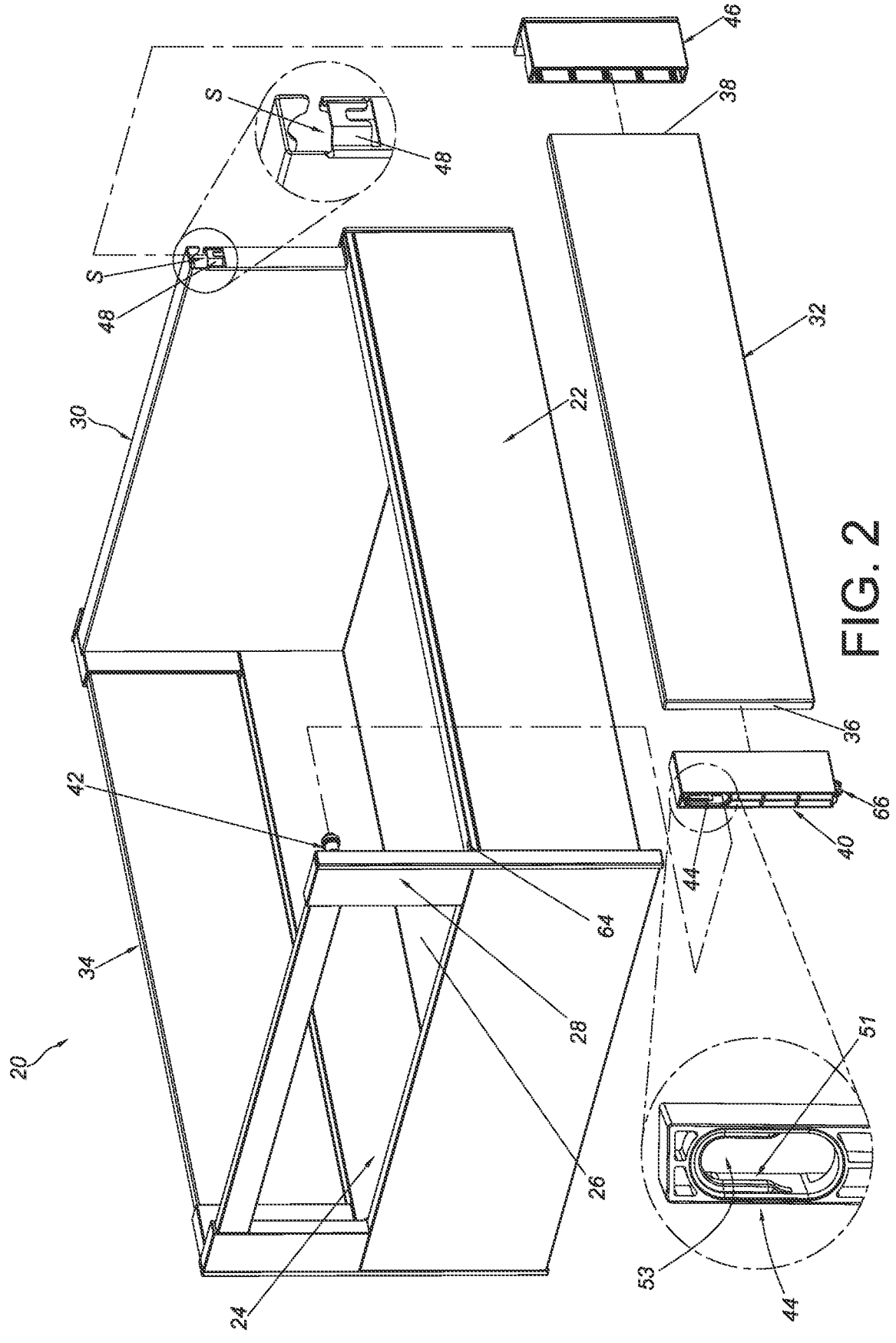
FIG. 2 is diagram showing a fitting member of the furniture system configured to be mounted to a first panel and a second panel of the furniture system through a first connecting member and a second connecting member according to the embodiment of the present invention.

As shown in FIG. 1 and FIG. 2, a furniture system 20 includes a first side wall 22, a second side wall 24, a bottom plate 26, a first panel 28 and a second panel 30 according to an embodiment of the present invention. In the present embodiment, the furniture system 20 is a drawer, but the present invention is not limited thereto.

The first side wall 22 and the second side wall 24 are arranged at a left side and a right side of the bottom plate 26 respectively. The left and right sides are only for illustration to facilitate understanding of relative positions, that is, the left and right sides are interchangeable, and are not intended to limit the specific positions. On the other hand, the first panel 28 and the second panel 30 are arranged at a front side and a rear side of the bottom plate 26 respectively. For example, the first panel 28 is a front panel, and the second panel 30 is a rear panel (or back panel), but the present invention is not limited thereto.

The first side wall 22, the second side wall 24, the bottom plate 26, the first panel 28 and the second panel 30 together define an accommodating space for accommodating objects.

In the present embodiment, the X-axis is a length direction of the furniture system 20, the Y-axis is a width direction of the furniture system 20, and the Z-axis is a height direction of the furniture system 20. The length direction, the width direction and the height direction are perpendicular to each other. In addition, left and right sides of the furniture system 20 have substantially identical structural arrangement. In respond to user requirements, the left side and the right side of the furniture system 20 can be respectively arranged with a first fitting member 32 and a second fitting member 34 to increase heights of the two side walls 22, 24, so as to match heights of the first panel 28 and the second panel 30.

In the following description, only the first fitting member 32 is illustrated since the second fitting member 34 is similar to the first fitting member 32. The first fitting member 32 comprises a first part 36 and a second part 38 (such as a front part and a rear part shown in FIG. 2) located at opposite positions, but the present invention is not limited thereto. The furniture system 20 further comprises a first connecting member 40 detachably mounted to the first part 36 of the first fitting member 32. The first fitting member 32 is configured to be mounted to the first panel 28 through the first connecting member 40 (as shown in FIG. 2). For example, the first panel 28 is arranged with a first connecting feature 42, and the first connecting member 40 is arranged with a second connecting feature 44 configured to be connected (such as detachably connected) with the first connecting feature 42 (as shown in FIG. 2). The first panel 28, the first fitting member 32 and the first connecting member 40 together form a furniture assembly.

Preferably, the furniture system 20 further comprises a second connecting member 46 detachably mounted to the second part 38 of the first fitting member 32. The first fitting member 32 is configured to be mounted to the second panel 30 through the second connecting member 46. For example, the second panel 30 is arranged with a first engaging structure 48, and the second connecting member 46 is arranged with a second engaging structure 50 (please also refer to FIG. 4) configured to be connected with the first engaging structure 48.

Preferably, the first fitting member 32 can be a wall or a rod. In the present embodiment, the first fitting member 32 is an extension wall, but the present invention is not limited thereto.

Preferably, the first fitting member 32 is made of a material selected from glass, metal, plastic and wood, but the first fitting member 32 is not limited to the aforementioned materials. In other words, a user can select the material of the first fitting member 32 according to use environment of the furniture system 20 or personal preference. For example, when the user selects glass as the material of the first fitting member 32, the user can see the objects accommodated in the furniture system 20 through the first fitting member 32 made of glass. In addition, the first fitting member 32 is detachably mounted to the first panel 28 through the first connecting member 40, and the first fitting member 32 is detachably mounted to the second panel 30 through the second connecting member 46.

Preferably, one of the first engaging structure 48 and the second engaging structure 50 is a protrusion. In the present embodiment, the first engaging structure 48 is a protrusion, and the protrusion surrounds and defines a mounting space S (as shown in FIG. 2). The other one of the first engaging structure 48 and the second engaging structure 50 is an extension piece. In the present embodiment, the second engaging structure 50 is an extension piece (please also refer to FIG. 4), and the extension piece is configured to be mounted (for example, inserted) into the mounting space S, such that the extension piece and the protrusion support or abut against each other.

Figure 3:
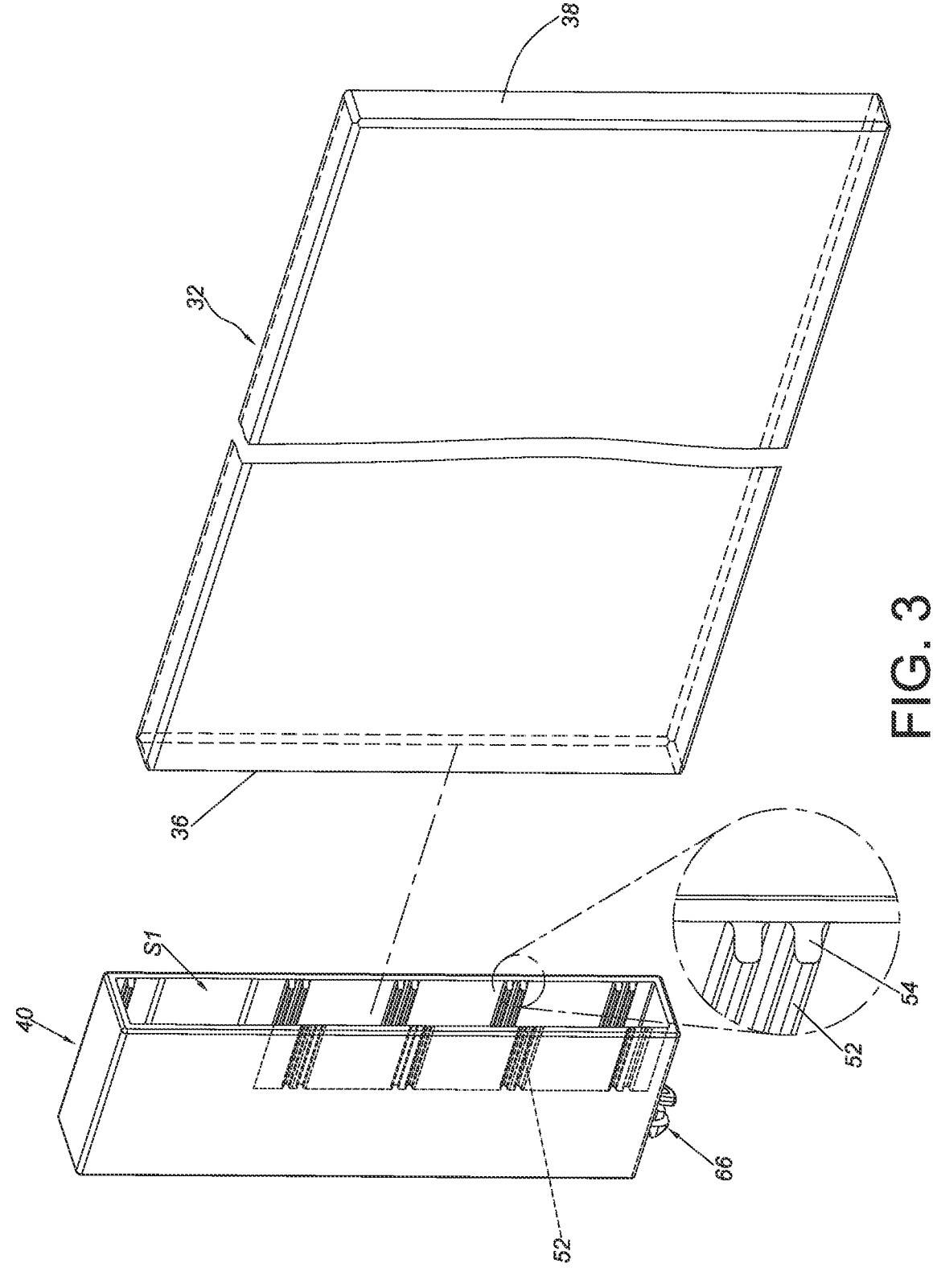
FIG. 3 is an exploded view of the fitting member and the first connecting member according to the embodiment of the present invention.

As shown in FIG. 3, one of the first connecting member 40 and the first part 36 of the first fitting member 32 is formed with a first space S1 for mounting the first connecting member 40 to the first part 36 of the first fitting member 32. In the present embodiment, the first connecting member 40 is formed with the first space S1 to mutually connect the first connecting member 40 with the first part 36 of the first fitting member 32 (please also refer to FIG. 1)

Preferably, the first connecting member 40 further comprises at least one first convex rib 52 formed inside the first space S1 and configured to press against the first part 36 of the first fitting member 32, in order to increase stability of mutual connection between the first fitting member 32 and the first connecting member 40.

Preferably, the at least one first convex rib 52 has a first guiding section 54 configured to guide the first part 36 of the first fitting member 32 to insert into the first space S1 of the first connecting member 40. The first guiding section 54 can has an inclined surface or an arc surface.

Figure 4:
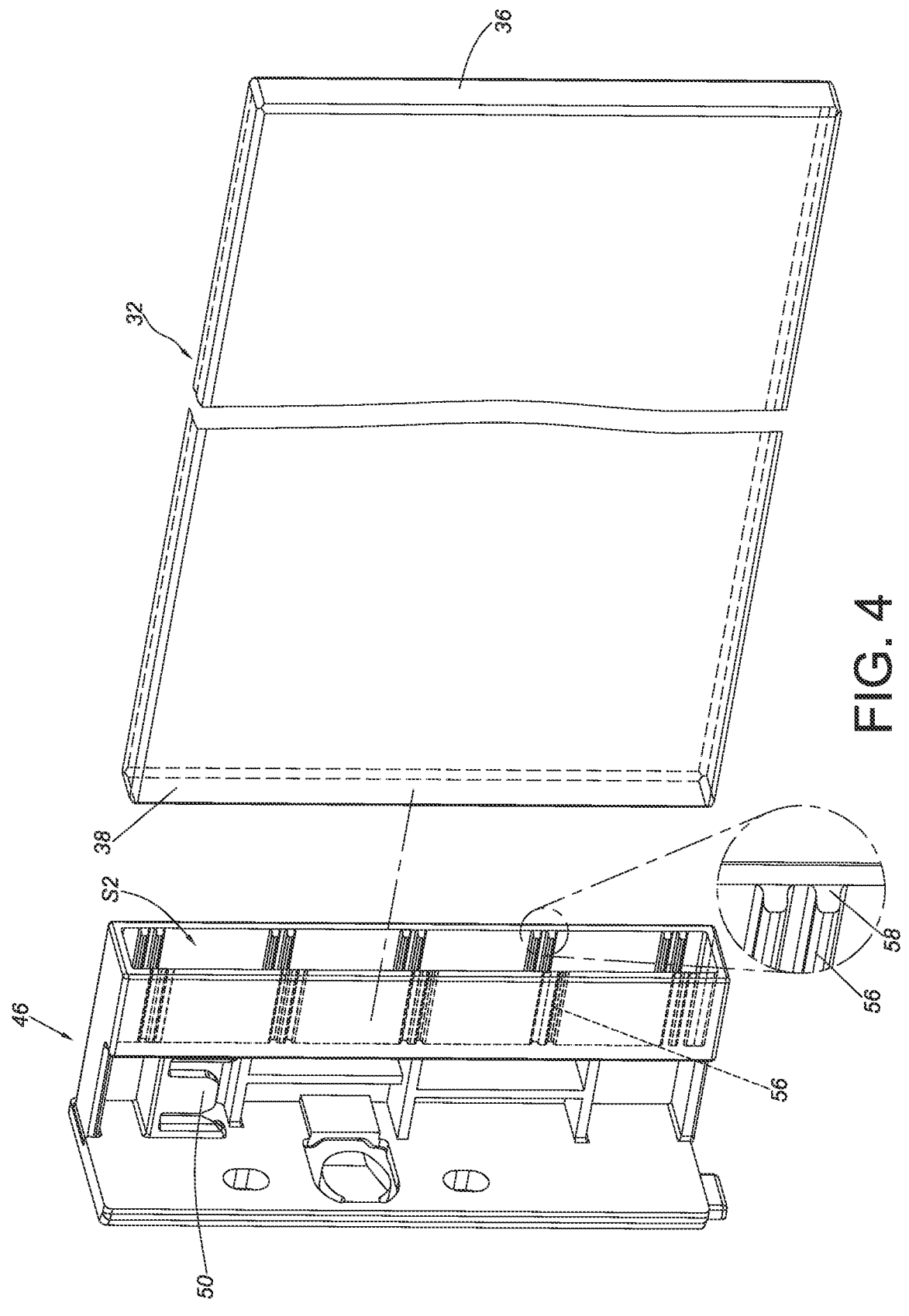
FIG. 4 is an exploded view of the fitting member and the second connecting member according to the embodiment of the present invention.

As shown in FIG. 4, one of the second connecting member 46 and the second part 38 of the first fitting member 32 is formed with a second space S2 for mounting the second connecting member 46 to the second part 38 of the first fitting member 32. In the present embodiment, the second connecting member 46 is formed with the second space S2 to mutually connect the second connecting member 46 with the second part 38 of the first fitting member 32 (please also refer to FIG. 1).

Preferably, the second connecting member 46 further comprises at least one second convex rib 56 formed inside the second space S2 and configured to press against the second part 38 of the first fitting member 32, in order to increase stability of mutual connection between the first fitting member 32 and the second connecting member 46.

Preferably, the at least one second convex rib 56 has a second guiding section 58 configured to guide the second part 38 of the first fitting member 32 to insert into the second space S2 of the second connecting member 46. The second guiding section 58 can has an inclined surface or an arc surface.

Figure 5:
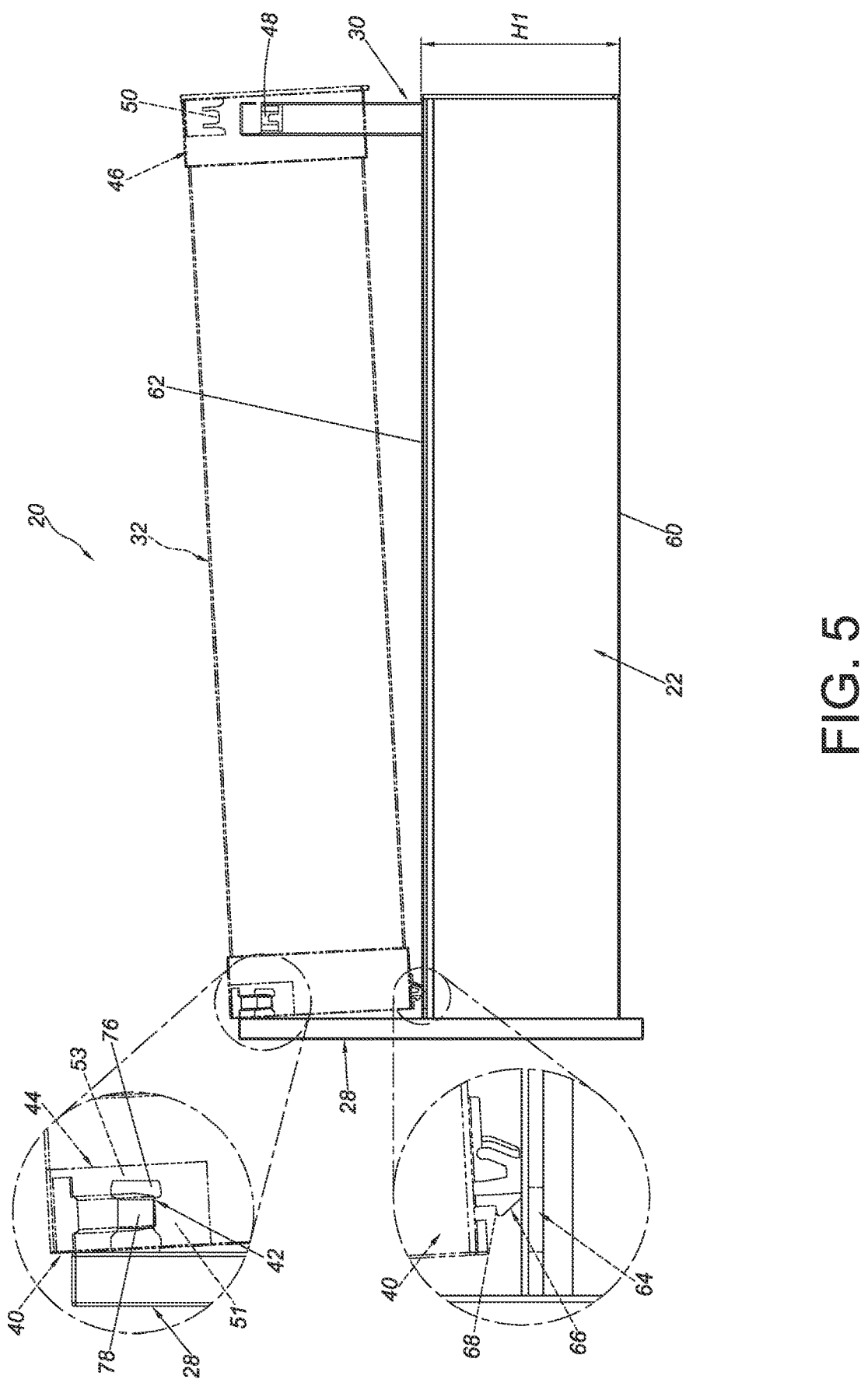
FIG. 5 is a diagram showing a first process of mounting the fitting member to the first panel, a side wall and the second panel according to the embodiment of the present invention.
Figure 6:
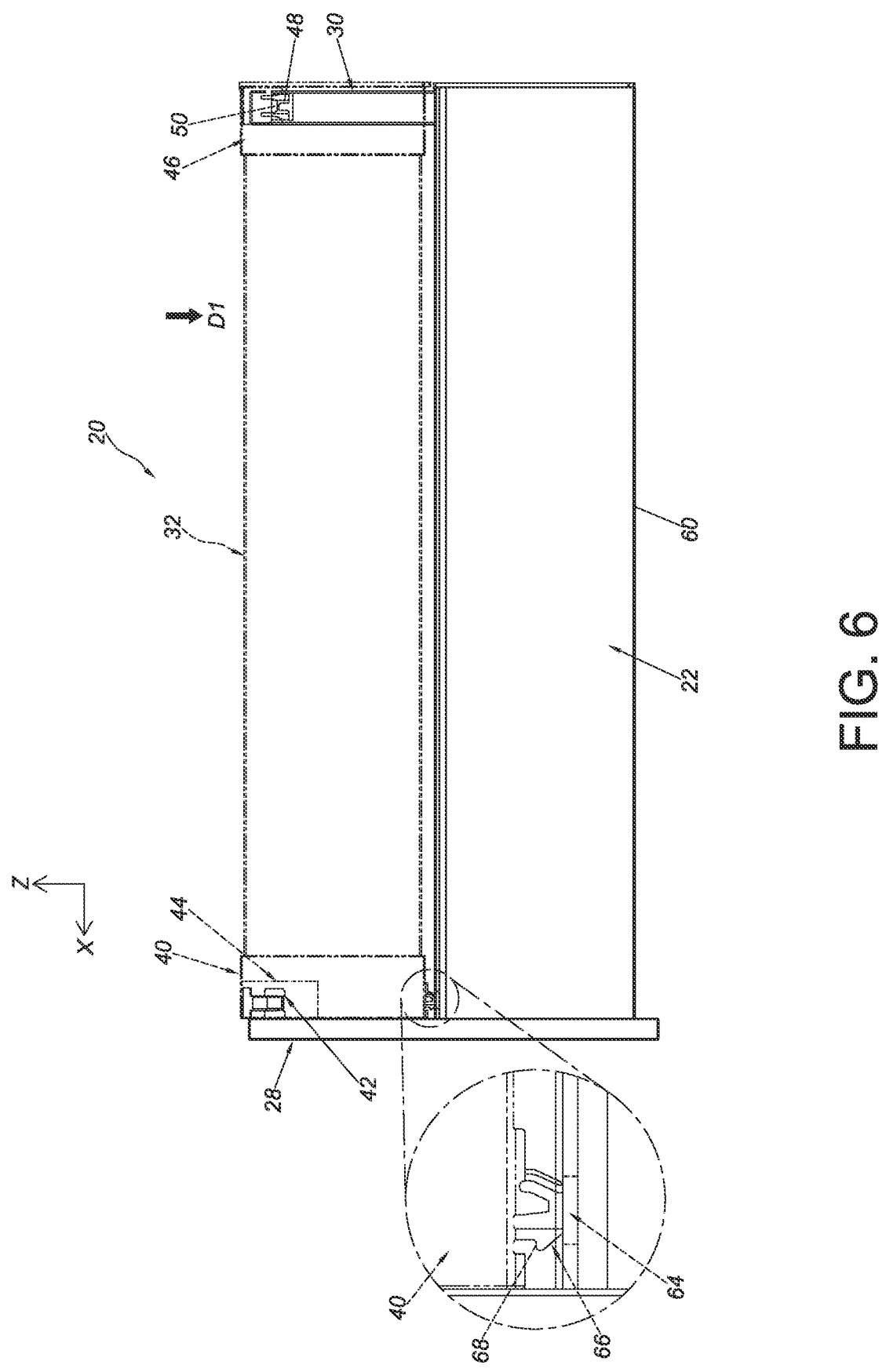
FIG. 6 is a diagram showing a second process of mounting the fitting member to the first panel, the side wall and the second panel according to the embodiment of the present invention.

As shown in FIG. 5 and FIG. 6, the first side wall 22 comprises a bottom part 60 and a top part 62. The top part 62 and the bottom part 60 of the first side wall 22 define a first predetermined height H1 (as shown in FIG. 5). The top part 62 of the first side wall 22 is arranged with a mounting feature 64. The first fitting member 32 is configured to be mounted to the mounting feature 64 through the first connecting member 40. For example, the mounting feature 64 is an opening, and the first connecting member 40 is arranged with at least one mounting part 66. The at least one mounting part 66 has a hook 68, and the hook 68 is configured to interact with the mounting feature 64. Preferably, the at least one mounting part 66 is elastic or flexible.

Preferably, the first connecting feature 42 comprises a head part 76 and an extension part 78, and the extension part 78 is connected between the head part 76 and the first panel 28. The second connecting feature 44 has an entrance 51 and a room 53 communicated with the entrance 51.

Furthermore, during a mounting process of mounting the first fitting member 32 to the first panel 28, the first side wall 22 and the second panel 30, the entrance 51 of the second connecting feature 44 allows the head part 76 of the first connecting feature 42 of the first panel 28 to pass through to further enter the room 53 (as shown in FIG. 5). Thereafter, the first fitting member 32 can be mounted to the first side wall 22 along a first predetermined direction D1 (such as a top-down direction shown in FIG. 6) with the at least one mounting part 66 being aligned with the mounting feature 64 of the first side wall 22.

Figure 7:
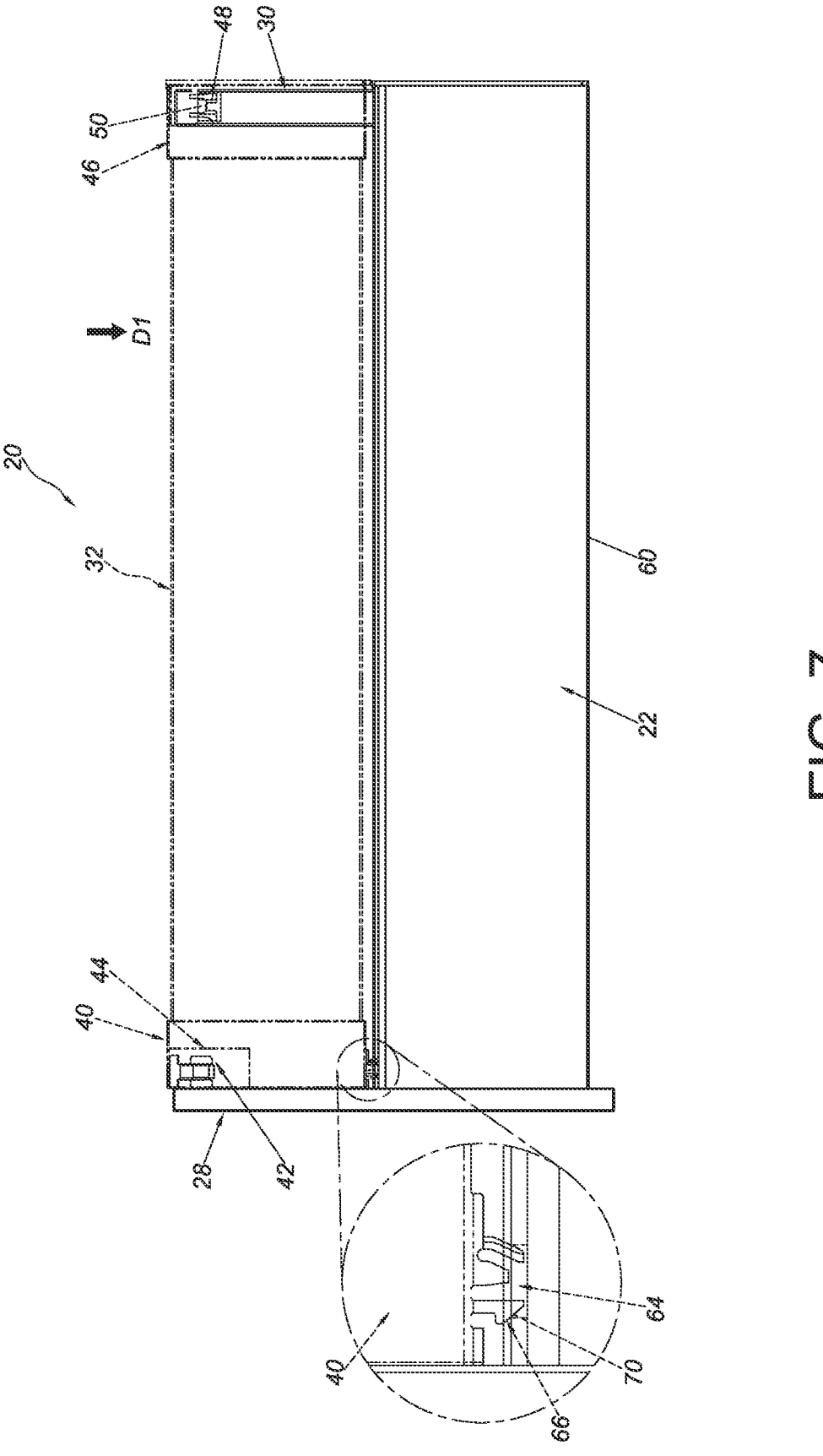
FIG. 7 is a diagram showing a third process of mounting the fitting member to the first panel, the side wall and the second panel according to the embodiment of the present invention.
Figure 8:
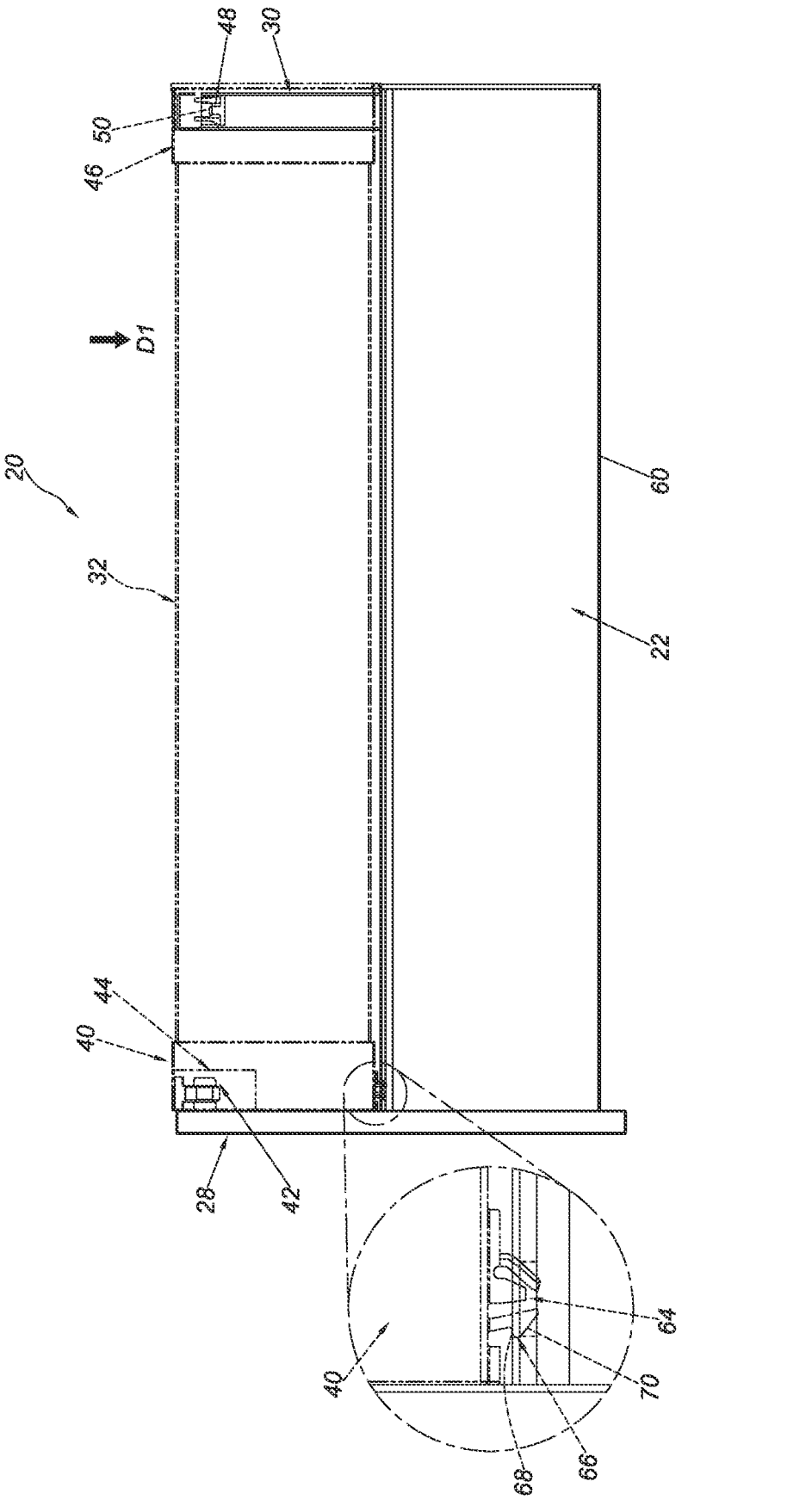
FIG. 8 is a diagram showing a fourth process of mounting the fitting member to the first panel, the side wall and the second panel according to the embodiment of the present invention.
Figure 9:
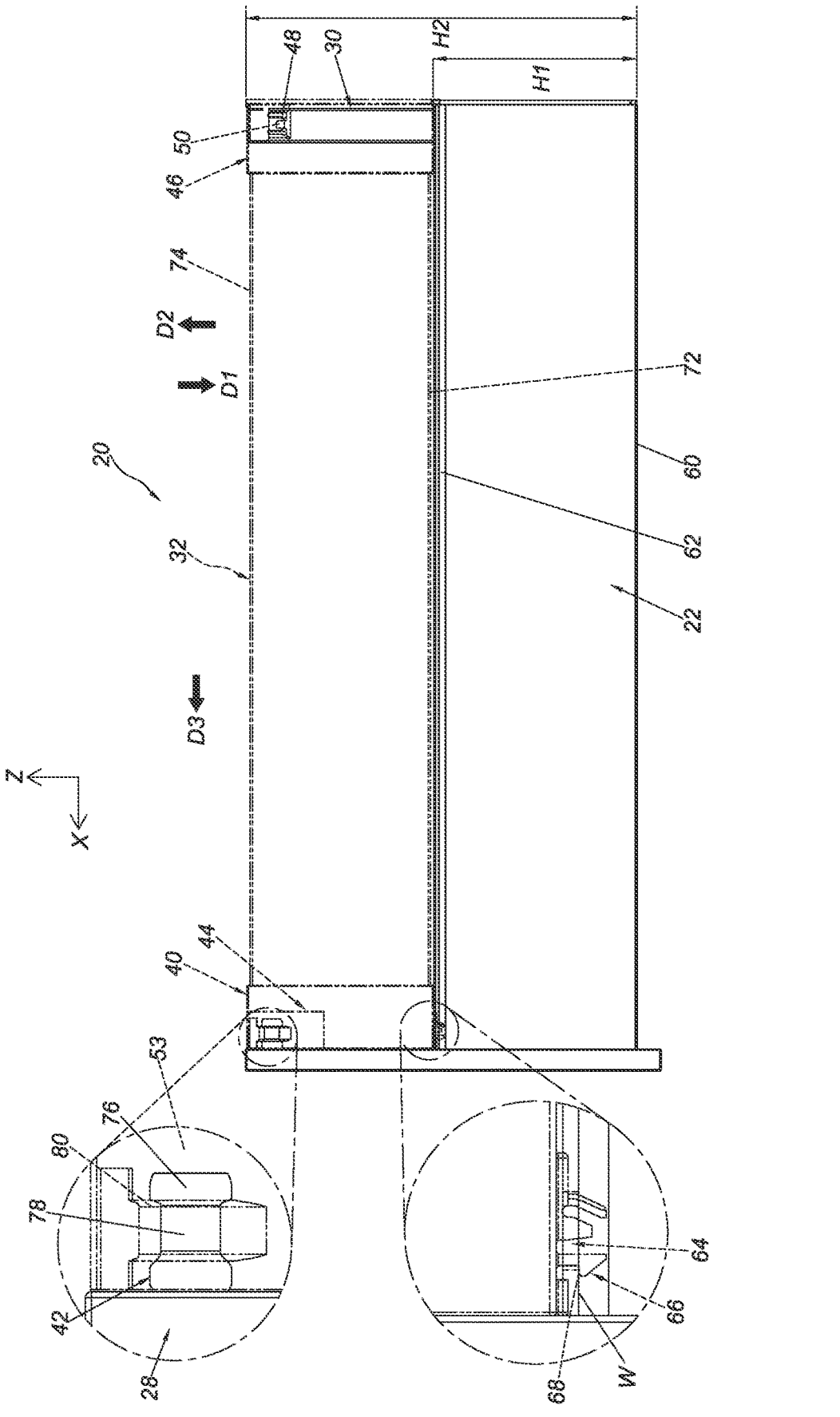
FIG. 9 is a diagram showing the fitting member being completely mounted to the first panel, the side wall and the second panel according to the embodiment of the present invention.

As shown in FIG. 7 to FIG. 9, the at least one mounting part 66 has a guiding feature 70, such as an inclined surface or an arc surface. When the first fitting member 32 is further moved along the first predetermined direction D1, the at least one mounting part 66 of the first connecting member 40 can be easily inserted into the mounting feature 64 (such as the opening) through the guiding feature 70. Meanwhile, the at least one mounting part 66 is elastically deformed to accumulate an elastic force due to the guiding feature 70 abutting against an inner wall of the mounting feature 64 (as shown in FIG. 8) until the at least one mounting part 66 of the first connecting member 40 is completely mounted to the mounting feature 64 of the first side wall 22 (as shown in FIG. 9). For example, when the at least one mounting part 66 of the first connecting member 40 is mounted to the mounting feature 64 (such as the opening), the hook 68 is configured to hook the mounting feature 64 (for example, to hook a wall at an edge of the opening) in response to release of the elastic force, in order to prevent the first fitting member 32 from being detached from the first side wall 22 along a second predetermined direction D2 opposite to the first predetermined direction D1. As such, the first fitting member 32 is mounted to the first side wall 22 (as shown in FIG. 9).

Preferably, when the first fitting member 32 is mounted to the first side wall 22, the head part 76 of the first connecting feature 42 is configured to be blocked by a predetermined wall 80 adjacent to the room 53 of the second connecting feature 44, in order to prevent the first panel 28 from being detached from the first fitting member 32 along a third predetermined direction D3. As such, the first fitting member 32 is mounted to the first panel 28 (as shown in FIG. 9).

Preferably, when the first fitting member 32 is mounted to the first side wall 22 along the first predetermined direction D1, the second engaging structure 50 of the second connecting member 46 is configured to be engaged with the first engaging structure 48 of the second panel 30, so as to detachably connect the first fitting member 32 with the second panel 30. As such, the first fitting member 32 is mounted to the second panel 30.

Preferably, the first fitting member 32 is configured to be mounted to the mounting feature 64 of the first side wall 22 through the at least one mounting part 66 of the first connecting member 40, so as to stack the first fitting member 32 on the first side wall 22 (as shown in FIG. 9).

Preferably, the first fitting member 32 comprises a bottom part 72 and a top part 74. The top part 74 of the first fitting member 32 and the bottom part 60 of the first side wall 22 define a second predetermined height H2 higher than the first predetermined height H1 (as shown in FIG. 9).

More particularly, when the user is going to detach the first fitting member 32 from the first side wall 22, the second panel 30 and the first panel 28, the user can lift the second part 38 (such as the rear part) of the first fitting member 32 or the second connecting member 46 (as shown in FIG. 5), in order to disengage the second engaging structure 50 of the second connecting member 46 from the first engaging structure 48 of the second panel 30. As such, the hook 68 of the first connecting member 40 on the first fitting member 32 can be detached from the mounting feature 64 of the first side wall 22, and the second connecting feature 44 of the first connecting member 40 can be detached from the first connecting feature 42 of the first panel 28, so as to detach the first fitting member 32 from the first side wall 22, the second panel 30 and the first panel 28.

Therefore, the furniture system and the furniture assembly according to the embodiments of the present invention have the following technical features:

1. The first connecting member 40 is detachably mounted to the first fitting member 32, and the first fitting member 32 is configured to be mounted to the first panel 28 through the first connecting member 40.

2. The second connecting member 46 is detachably mounted to the first fitting member 32, and the first fitting member 32 is configured to be mounted to the second panel 30 through the second connecting member 46.

3. The first fitting member 32 is detachable from the first connecting member 40 and the second connecting member 46. Therefore, the user can select a proper material (for example, glass, metal, plastic, wood, etc.) as the material of the first fitting member 32 in order to meet diverse requirements of the market.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A furniture system, comprising:
   a bottom plate;
   a first side wall and a second side wall arranged at left and right sides of the bottom plate respectively;
   a first panel and a second panel arranged at front and rear sides of the bottom plate respectively;
   a fitting member comprising a first part and a second part;

a first connecting member detachably mounted to the first part of the fitting member, wherein the fitting member is configured to be mounted to the first panel through the first connecting member; and a second connecting member detachably mounted to the second part of the fitting member, wherein the fitting member is configured to be mounted to the second panel through the second connecting member;

wherein the first panel is arranged with a first connecting feature extended along a length direction of the furniture system, and the first connecting member is arranged with a second connecting feature having an entrance and a room communicated with the entrance;

wherein the second panel is arranged with a first engaging structure as a protrusion surrounding and defining a mounting space, and the second connecting member is arranged with a second engaging structure extended along a height direction of the furniture system;

wherein during a mounting process of mounting the fitting member to the first panel, the first side wall and the second panel, the first connecting feature is configured to be detachably connected with the second connecting feature by passing through the entrance to enter the room along the length direction after the first connecting member has been detachably mounted to the first part of the fitting member, and the second engaging structure is configured to be detachably engaged with the first engaging structure by inserting into the mounting space of the first engaging structure along the height direction after the second connecting member has been detachably mounted to the second part of the fitting member.

2. The furniture system of claim 1, wherein the first side wall comprises a bottom part and a top part, the top part and the bottom part of the first side wall define a first predetermined height, the top part of the first side wall is arranged with a mounting feature; the fitting member comprises a bottom part and a top part, the top part of the fitting member and the bottom part of the first side wall define a second predetermined height higher than the first predetermined height; wherein the fitting member is configured to be mounted to the mounting feature through the first connecting member, so as to stack the fitting member on the first side wall.

3. The furniture system of claim 2, wherein the mounting feature is an opening, the first connecting member is arranged with at least one mounting part configured to be mounted to at least one wall at an edge of the opening; wherein the at least one mounting part has a hook configured to hook the wall.

* * * * *